US011419467B2

(12) United States Patent
Fitzsimmons et al.

(10) Patent No.: US 11,419,467 B2
(45) Date of Patent: Aug. 23, 2022

(54) BUCKET LID FOR AUXILIARY CYCLONE DUST COLLECTOR

(71) Applicants: John J. Fitzsimmons, Clay, NY (US); Jeffrey Hill, Cicero, NY (US); Joseph Baldwin, Syracuse, NY (US); Kyle W. Groening, Syracuse, NY (US); Robert M. Witter, Englewood, FL (US)

(72) Inventors: John J. Fitzsimmons, Clay, NY (US); Jeffrey Hill, Cicero, NY (US); Joseph Baldwin, Syracuse, NY (US); Kyle W. Groening, Syracuse, NY (US); Robert M. Witter, Englewood, FL (US)

(73) Assignee: Oneida Air Systems, Inc., Syracuse, NY (US)

( * ) Notice: Subject to any disclaimer, the term of this patent is extended or adjusted under 35 U.S.C. 154(b) by 71 days.

(21) Appl. No.: 17/155,292

(22) Filed: Jan. 22, 2021

(65) Prior Publication Data

US 2021/0228036 A1 Jul. 29, 2021

Related U.S. Application Data

(63) Continuation-in-part of application No. 29/726,472, filed on Mar. 3, 2020, now Pat. No. Des. 933,321.

(60) Provisional application No. 62/964,913, filed on Jan. 23, 2020.

(51) Int. Cl.

| | |
|---|---|
| ***B01D 50/00*** | (2022.01) |
| ***A47L 9/14*** | (2006.01) |
| ***B04C 5/185*** | (2006.01) |
| ***A47L 9/16*** | (2006.01) |

(52) U.S. Cl.
CPC ........... *A47L 9/1445* (2013.01); *A47L 9/1463* (2013.01); *A47L 9/1691* (2013.01); *B04C 5/185* (2013.01); *A47L 9/14* (2013.01); *A47L 9/16* (2013.01); *A47L 9/1683* (2013.01)

(58) Field of Classification Search
CPC .... A47L 9/1445; A47L 9/1463; A47L 9/1691; A47L 9/14; A47L 9/1683; A47L 9/16; B04C 5/185
See application file for complete search history.

(56) References Cited

U.S. PATENT DOCUMENTS

| | | | | |
|---|---|---|---|---|
| 5,935,279 | A | 8/1999 | Kilstrom | |
| 7,282,074 | B1 | 10/2007 | Witter | |
| 2018/0177365 | A1* | 6/2018 | Conrad | B65F 1/14 |
| 2018/0369849 | A1* | 12/2018 | Loos | B05B 14/45 |

FOREIGN PATENT DOCUMENTS

| | | | | | |
|---|---|---|---|---|---|
| CN | 104545695 | A | * | 4/2015 | A47L 9/127 |
| CN | 104840152 | A | * | 8/2015 | A47L 5/24 |
| KR | 101672637 | B1 | * | 11/2016 | B04C 5/185 |

* cited by examiner

*Primary Examiner* — Dung H Bui
(74) *Attorney, Agent, or Firm* — Bernhard P. Molldrem, Jr.

(57) ABSTRACT

A bucket lid for a cyclone dust collector is configured to fit onto a standard pail or bucket, with a circumferential rim forming an outer edge of the lid, a central mounting disk onto which the cyclone is mounted, and a series of baffles extending circumferentially around the lid between the mounting disk and the rim. These baffles extend downward into the bucket to interfere with swirl in the bucket from dust discharged from the cyclone. The baffles may be radial ribs alternating with ramped coffers. The lid may be formed of anti-static polypropylene.

8 Claims, 3 Drawing Sheets

BUCKET LID FOR AUXILIARY CYCLONE DUST COLLECTOR

This application claims domestic priority under 35 U.S.C. § 119(e) of provisional patent application Ser. No. 62/964,913, filed Jan. 23, 2020. This is a continuation-in-part of U.S. Ser. No. 29/726,472, filed Mar. 3, 2020. The contents of the above patent applications are incorporated herein by reference.

This invention concerns an improvement to an auxiliary dust collection system in which a cyclone is placed in-line between a source of dust-laden air and a vacuum machine such as a shop-vacuum or dust extractor. An example of an auxiliary dust collector system is described in U.S. Pat. No. 7,282,074. A product as described in that patent is sold under the trademark Dust Deputy® and comprises a small V-shaped cyclone that is typically mounted on a standard bucket, i.e., with a ring flange on the nose of the cyclone bolted onto the lid of that bucket. The cyclone can be made of plastic or steel. The current plastic Dust Deputy® is typically mounted on a five-gallon pail of the type commonly used also for paint, drywall joint compound and other products, with a standard lid. The lid is in the form of a circular disc with an annular channel at its rim to fit over the top of the pail. Standard 2½ and 3 gallon pails can also be used. The current model Dust Deputy® or similar cyclone typically has a flange ring surrounding the open nose of the cone, with six holes in the flange ring for mounting bolts. For mounting the cyclone, a round hole is punched or cut at the center of the lid, and a ring of bolt holes are cut or drilled to receive threaded fasteners, e.g., machine screws or bolts. Also a round gasket or seal may be fitted around the hole between the top surface of the lid and the flange ring to block leakage into the pail. This cyclone, pail and lid combination works adequately under the negative operating pressure conditions usually present within the cyclone and dust collection pail, and can resist the crushing force of the atmosphere, at least for the most part. A negative pressure of up to about 80-140 inches of water column can occur when the system is dead-headed, i.e., when the vacuum hose between the dust pickup tool and the cyclone becomes plugged. In that case the higher negative pressure can cause the lid and/or pail to buckle or distort. These lids can then become wobbly due to the flat nature of the plastic lid and the flexing of the material (typically only 90 mils thick). Another problem with the standard lid is that there is some residual swirl in the air within the pail just below the nose of the cyclone, and this can produce re-circulation of the collected dust because of the swirl in the air that may be reaching into the collected dust. The air's momentum keeps fine dust in suspension in the pail and the suspended dust can be sucked back into the cyclone, thus counteracting the system's separation efficiency. This is known as re-uptake of or re-entrainment.

What the inventors here have developed is an improved lid that is specifically designed to support a Dust Deputy® or similar cyclone, and provide additional support above and beyond what can be provided by a standard flat bucket lid. The improved lid can include baffle structure to trap any swirl in the dust collection bucket, thereby increasing the particle-capturing efficiency of the cyclone. The baffling also provides structural support. Preferably, the improved lid has a pre-formed opening for the nose of the cyclone and screw holes with nut pockets (hex recesses) for the bolts and nuts. Alternatively there can be built-in mounting screw bosses so no holes have to be drilled and no nuts need to be used.

The specially designed lid has deep ribs to make it stiffer to avoid distortion. The stiffening ribs are configured to act as interference vanes or baffles to absorb some of the "swirl" within the top part of the pail.

In addition to the design described just above, the lid can be made in a larger size to fit onto a larger dust collection barrel and support a larger cyclone, such as the Super Dust Deputy, as shown and described in U.S. Pat. D-703,401.

The lid can be configured in right-hand and left-hand versions to match the air rotation direction of the associated cyclone.

The new lid can favorably be made by injection molding. A polypropylene (PP) is preferred for the lid, as it has better high-temperature performance than the polyethylene that is used in the standard pail lid. The lid can be of a natural color or clear material, or can be translucent or opaque in a desired color. The material can be a weakly-conductive anti-static material.

The center of the top surface is molded flat to mate with the flange ring of the cyclone so that no seal ring or gasket is needed, although a thin strip gasket can be used as an option.

Latches are molded into the rim of the lid. There may be one or more latches around the rim, or there may be a single latch plus a one or more passive "hook" portions. These arrangements help secure the lid more securely to the pail.

Preferably, there are six mounting holes surrounding the central opening on the lid, with each mounting hole having a nut pocket on the under side. These are intended to be used with #10 machine screws and corresponding nuts. Lock washers and/or Nylock nuts can be used, if desired.

In a preferred embodiment, the lid has six radial ribs and six ramped coffers; however any number of ribs and coffers are possible. This configuration adds stiffness to the lid, and interferes with circular air flow (swirl) in the pail, thus reducing re-uptake of the collected dust. The reduced uptake improves the system's particle collection efficiency.

While this lid design is intended for use as a bucket lid for the dust collection system described here, there are several possible cross-applications. A similar construction may be used in connection with a dust collector that employs a hopper and Longopac continuous bagging, of the type that is described in our earlier-filed provisional patent application 62/870,435, Jul. 3, 2019, incorporated by reference herein.

In accordance with an aspect of this invention, a dust collection system employs a cyclonic separator in which an intake hose connects to an inlet tube near the top of the cyclone, and an outlet hose connects to the vortex tube that extends out the top of the cyclone and connects to a vacuum source. The base or nose of the cyclone is mounted onto the lid of a dust collection receptacle where the dust drops out from the cyclone into the receptacle beneath. In the case where the receptacle is a small (e.g., up to ten gallons) plastic pail, the lid is provided with rib and baffle structure that breaks up the swirl pattern of air movement within the receptacle. Clamp structure is provided at the rim of the lid to mate with and latch onto the rim of the pail. The baffles can be ramped coffers. Pre-formed mounting holes are provided for the threaded fasteners used to hold the ring flange of the cyclone onto the top of the lid.

As an alternative, similar anti-swirl baffle structure may be used on the disc employed with the dust separator of low-profile Thiele design.

BRIEF DESCRIPTION OF DRAWING FIGURES

DETAILED DESCRIPTION OF PREFERRED EMBODIMENT(S)

Figure 1:
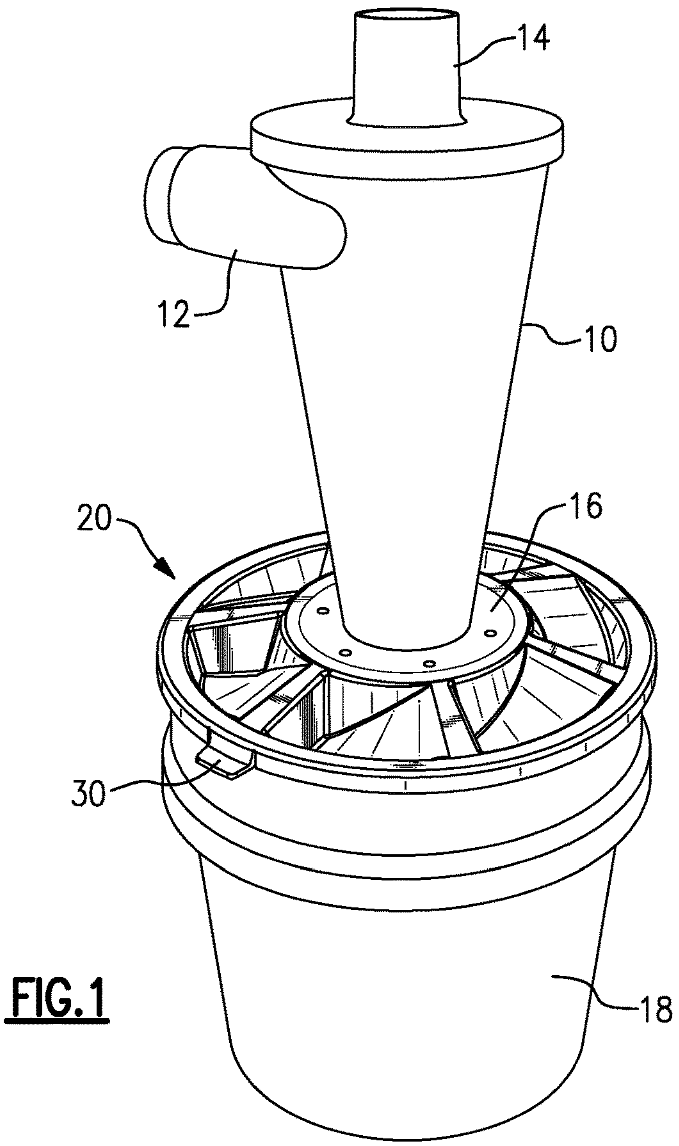
FIG. 1 is a perspective view of a dust collection arrangement with a cyclone mounted upon a lid according to an embodiment of this invention, and placed upon a dust receptacle.

FIG. 1 shows an arrangement of a small plastic cyclonic dust collection system employing a V-shaped plastic cyclone 10. An inlet tube 12 enters the cyclone 10 near the top, and a vortex tube 14 or exhaust tube exits the cyclone at the top center. The intake hose from the dust pick-up tool (not shown) connects to the inlet tube 12 and an exhaust hose (not shown) that leads to a vacuum source connects to the vortex tube 14. A flange ring 16 is provided at the base or nose of the cyclone 10. Dust exiting the cyclone is collected in a bucket 18, here shown as a standard 5-gallon plastic bucket as described earlier. The flange ring 16 bolts to the center of a lid 20, as will be described in detail with respect to the remaining drawing views.

Figure 2:
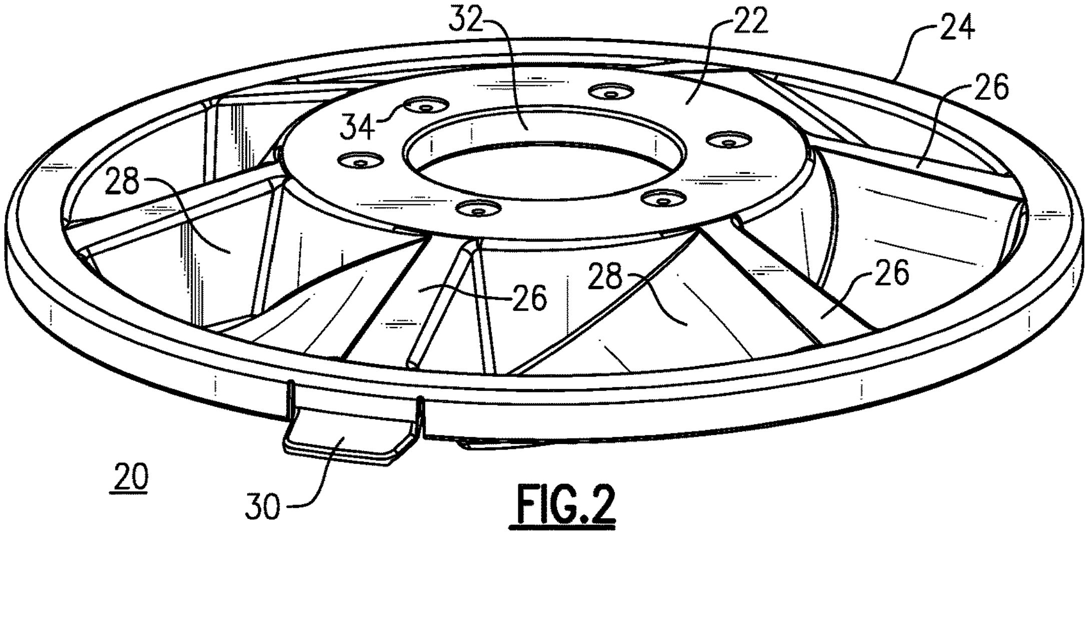
FIGS. 2 and 3 are perspective views of the lid of this invention.
Figure 3:
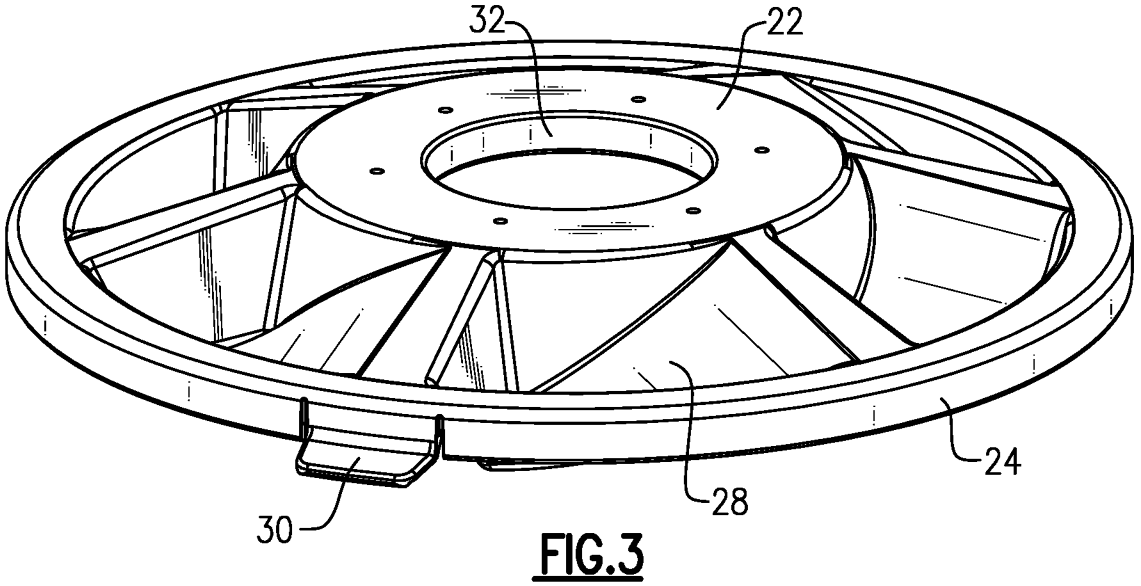
Figure 4:
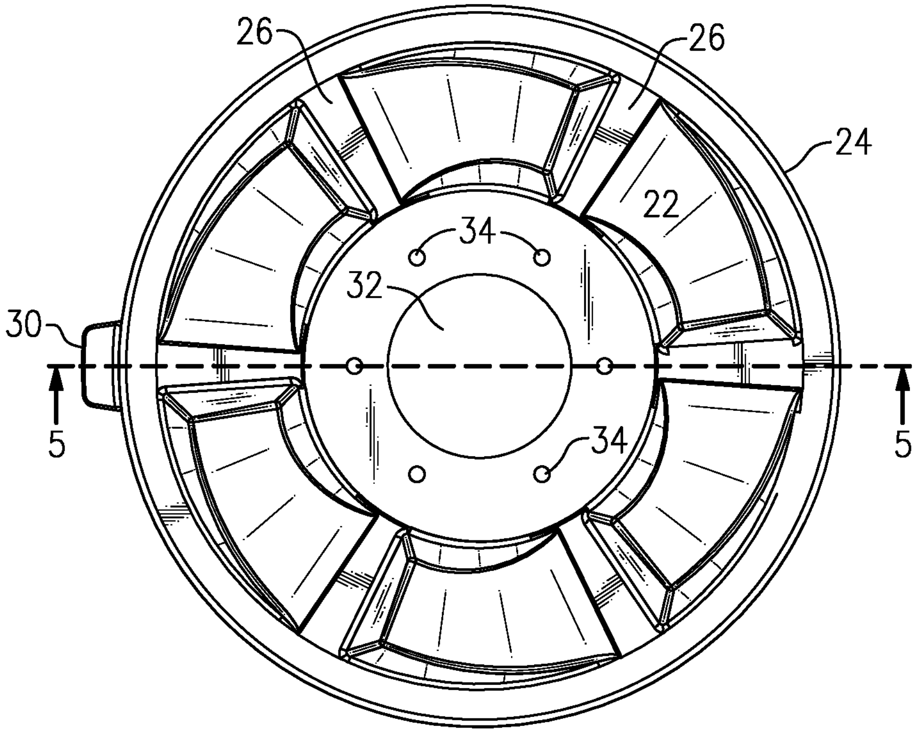
FIG. 4 is a top plan view thereof.

The lid is shown in perspective in FIGS. 2 and 3. The lid 20 is formed of a tough plastic resin, favorably polypropylene of sufficient thickness, preferably 100 mils (0.1 inch) with a flat central disk 22 onto which the ring flange 16 of the cyclone is to be mounted, and a rim 24 at the circumference of the lid to fit onto the rim of the pail 18. Between the disk 22 and the rim 24 are a series of radial ribs 26 and coffers 28 with the ribs and coffers alternating as shown. The coffers 28 appear as indentations or recesses on at the upper side of the lid, but on the underside these appear as projections that extend down towards any collected dust in the pail 18. The coffers 28 can each have one generally flat and vertical side facing against the circulation or swirl direction as determined by the cyclone, and a ramped or sloping side in the air flow direction. In other embodiments, other shapes may be used for the ribs and coffers. At least one clamp 30 is formed along the annular channel of the rim 24 of the lid, which can be affirmatively clamped onto the rim of the pail to hold the lid securely in place.

On the flat central disk 22 there is formed a central opening 32 that aligns with the nose of the cyclone 10 and there are also formed six mounting holes 34, here at sixty-degree intervals around the opening 32. The flange 16 of the cyclone 10 mounts onto the disk 22, and the mounting holes 34 are designed to align with the bolt holes on the cyclone's ring flange.

Figure 5:
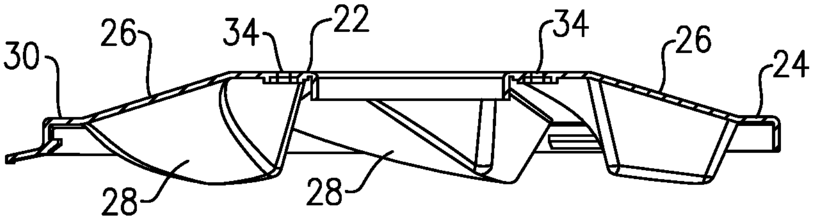
FIG. 5 is a sectional view taken at 5-5 of FIG. 4.

As seen in FIG. 5, the mounting holes 34 may each have a recess at the underside of the lid to serve as a nut pocket for a standard threaded nut to fit the recommended #10 bolts or machine screws. As an alternative, these mounting holes may be in the form of threaded bosses 134 (FIG. 7) such that a separate nut is not needed for each bolt.

Figure 6:
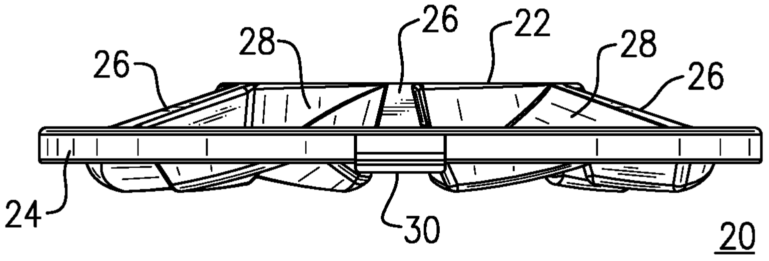
FIG. 6 is a side elevation of the lid of this invention.
Figure 7:
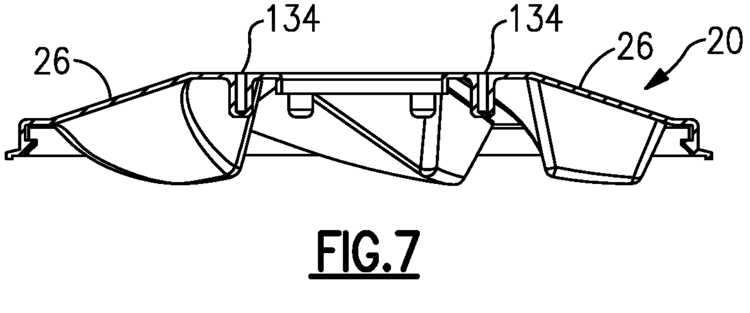
FIG. 7 is a sectional view similar to FIG. 5, but with threaded screw bosses rather than nut pockets.

As shown in FIGS. 5 to 7, the lid 20 of this embodiment is shaped such that the central disk 22 is elevated about ¾ inch above the level of the rim 24, This places the connecting ribs 26 sloping higher towards the central disk 22, and so that the coffers 28 ramp up in the radially inward direction, as shown. The coffers 28 also ramp upward in the circumferential direction, i.e., the air flow direction. However, as discussed earlier, the coffers and ribs could have different shapes, and there does not have to be six of them only, as illustrated in this example. There could be fewer ribs and coffers, or more of them, depending on the application and system characteristics.

While one clamp member 30 is shown here as an example, there may be two or several clamps distributed around the circumference of the rim 24. There are other constructions of clamp that may be used.

Many modifications and variations would be apparent to persons of skill in the art without departing from the scope and spirit of this invention, as defined in the appended Claims.

What is claimed is:

1. In combination, a dust collection cyclone having a mounting ring flange; a dust collection bucket; and a lid adapted to support the mounting ring flange of said cyclone and which is configured to fit onto the rim of said bucket; said lid comprising a circumferential rim at the outer edge of the lid;

a central mounting disk configured to support a mounting ring flange of a cyclone, the central mounting disk having a central opening adapted for passage of dust from the cyclone into the bucket and mounting openings for receiving fasteners that hold the mounting ring flange onto the central mounting disk of said lid; and an annular portion extending between said circumferential rim and said central mounting disk and closed to the passage of air therethrough, the annular portion including a series of baffles extending circumferentially in said circumferential portion of the lid, said baffles extending downward from the disk to interfere with swirl of dust-laden air in said bucket beneath said lid; wherein said series of baffles is in the form of a plurality of radial ribs alternating with ramped coffers.

2. The combination according to claim 1 wherein said circumferential rim includes at least one clamp member configured for removably closing over the rim of said bucket.

3. The combination according to claim 1 wherein each said baffle is formed of a said radial rib followed in the direction of air flow by a respective upward sloping coffer.

4. The combination according to claim 3 wherein each said rib ramps upward in the radially inward direction.

5. The combination according to claim 4 wherein said central mounting disk is elevated above the circumferential rim.

6. The combination according to claim 1 wherein said lid is formed of a low-conductance anti-static polypropylene.

7. The combination according to claim 1 wherein said mounting openings in said central mounting disk each have a recess at the underside of the lid configured to serve as a nut pocket.

8. The combination according to claim 1 wherein said mounting openings in said central mounting disk are in the form of female-threaded bosses.

* * * * *